Patented July 11, 1933

1,917,618

UNITED STATES PATENT OFFICE

JOHN F. USENER, SR., AND JOHN F. USENER, JR., OF HOUSTON, TEXAS

AUTOMATIC POWER FACTOR CONTROL FOR SYNCHRONOUS MOTOR GENERATORS

Application filed August 17, 1928. Serial No. 300,190.

Our invention relates to synchronous motor generator systems for power production and has particular reference to a novel system for automatic power factor control. Such control is effected by a novel method of automatically overcompounding the voltage of the exciter whereby to maintain a power factor of unity.

Heretofore in this art it has been found exceedingly difficult in the use of motor generator sets having direct current generators supplying power for the operation of electric railway lines or any other type of variable load service, to maintain any substantially constant power factor. The power factor control has heretofore been effected by the manual operation of the exciter field rheostat to vary the exciter voltage in conjunction with the manual operation of a variable resistance connected in series with series field windings of the alternating current motor.

We have discovered that this manual control operation can be dispensed with and the power factor control made automatic by the change in the circuit connections of the exciter and generator employed in the set.

It is intended that our improvement may be arranged upon either a shunt or compound wound exciter as the occasion requires. By the arrangement of our improvement for both types of exciters, existing machines may be equipped without the necessity of installing a new exciter.

Objects of the invention are: to secure automatic power factor control in synchronous motor generator sets; to provide a novel method of overcompounding exciter voltages to bring about a power factor of unity in synchronous motor generator sets; to provide a novel circuit system for carrying out these objects; and generally to provide an improved and efficient automatic power factor control system.

An additional object is to so alter the series field of compound wound exciters that the manual control of exciter field rheostat is dispensed with.

A further object is to place upon either a shunt field exciter or on the series field of a compound wound exciter a number of auxiliary windings to furnish the necessary exciter voltage for the motor.

With these objects and such others in view as will be apparent from the description, our invention resides in the novel method, combination, construction and arrangement of parts hereinafter described and claimed and illustrated in the accompanying drawing wherein are shown two practical, physical embodiments of the principles of the invention.

Figure 1:
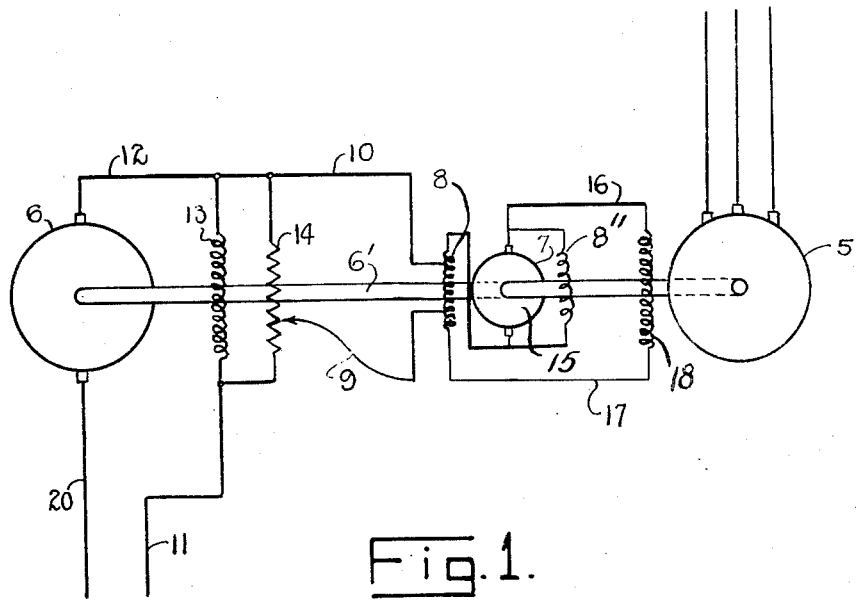
Figure 1 is a schematic diagram of a synchronous motor generator set with a direct exciter drive from the generator and illustrating the circuit arrangement for carrying out the invention, as applied to a compound wound exciter.

The invention as shown in Figure 1 illustrates the employment of the invention in connection with a synchronous motor 5 directly connected for operating a direct current generator 6 through the shaft 6′, which generator has direct driving connection with an exciter 7 for the field windings of the motor 5. It has heretofore been the practice to connect the exciter series fields directly to the field windings of the synchronous motor and this has uniformly resulted in a varying power factor due to the practical impossibility of maintaining a constant power factor by manual control as hereinbefore stated.

As illustrated in Figure 1, the exciter 7 is provided with the usual series wound fields 8 and the leads 9 and 10. These leads 9 and 10 have been tapped into the series wound field 8 of the exciter and are connected across the leads 11 and 12 of the series fields 13 of the direct current generator. Between the leads 11 and 12 of the generator there is connected a resistance shunt 14 and one of the leads from the series fields of the exciter, illustrated in this embodiment as the lead 9, is connected to a predetermined point on the shunt 14, this point being determined by calculation and experimentation so that there is obtained a definite fixed ratio between the generator load and the ampere turns on the exciter field. In this embodiment of the invention the rotor of the exciter is connected by the leads 16 and 17 to the field winding 18 of the motor 5. It will be understood from an inspection of the drawing that the generator 6 is of the compound wound type employing the three leads 11, 12 and 20. The wires 11 and 20 are the lead lines which connect with the electrical circuit, which is being furnished with power. While the line 12 is known as an equalizer line and is connected to the armature and the series field of the generator. It should be particularly noted that the shunt 14 spans the wires 11 and 12 but is not connected in any manner to the positive lead 20. In this manner the series fields of the exciter are not connected across the armature as has been previously practiced.

The arrangement shown in Figure 1 is that where a compound wound exciter is in use and the wires 9 and 10 have been tapped into the series fields of the exciter at the desired point to obtain the necessary exciter voltage for the motor 5.

Figure 2:
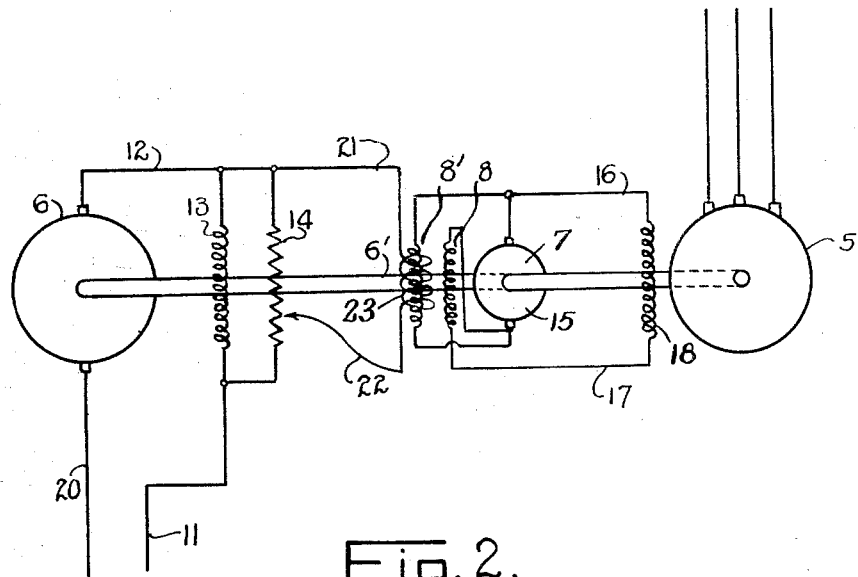
Figure 2 is a similar schematic diagram illustrating the circuit arrangements for sets employing our auxiliary windings as applied to either a shunt wound or compound wound exciter.

The novelty residing in the circuit arrangement of Figure 2 consists in providing the shunt wound exciter fields 8' with a number of turns 23 of externally wound wire of any suitable size. The ends of the wire 23 shown at 21 and 22 are connected in series with the shunt 14 and the lead 12 of the direct current generator similar to the leads 9 and 10 illustrated in Figure 1. By this arrangement it is possible to overcompound a shunt wound exciter for use with our automatic power factor control.

The circuit shown in Figure 2 may be adapted for connection on a compound wound as well as for shunt exciter fields. As in some instances it is not desirable to tap into the series fields as is shown in Figure 1. Under these circumstances wire of any suitable size is wound about the outside of the existing field a sufficient number of turns to obtain the desired results.

By practicing this invention in accordance with the principles set forth herein it is evident that as the load builds up on the generator there is a corresponding increase of current which is shunted through the leads 9 and 10 or 21 and 22 as the case may be to the fields of the exciter, thereby automatically raising the voltage of the exciter to correspond with the increased load of the generator. Conversely as the load in the generator decreases, the voltage of the exciter drops correspondingly due to the reduction in current flowing through the windings of the exciter fields. By this system the load on the generator is utilized to influence the exciter fields to control the voltage of the exciter for the motor and the power factor is thereby automatically controlled from the behavior of the generator. The human factor is dispensed with as the manual control through the operation of the rheostat is eliminated and the entire system made automatic in its operation.

While in this description of preferred embodiments of our invention we have illustrated and described certain specific details we desire it to be understood that the invention is not to be limited thereby but that any desired changes and modifications may be made in such details as will fall within the scope of the invention as claimed.

We claim:

1. In a synchronous motor generator system including a generator having a series field winding, a motor exciter, a shunt circuit connected across the series field winding circuit of the generator and serially including the exciter field.

2. In a synchronous motor generator system, a generator with a series field winding, an exciter having a rotor and a field stator, and a shunt circuit across the series field winding of the generator and including the field winding of the exciter.

3. In a synchronous motor generator system including a generator having a series field winding, a motor field exciter having field windings, a shunt circuit from the generator field winding circuit arranged to influence the exciter field winding, and including a resistance.

4. In a synchronous motor generator system including: an alternating current motor; a field exciter therefor and including a rotor and a field stator; and a compound wound direct current generator; a resistance shunt across the series field winding leads of said generator, and a circuit serially including one of said leads, the exciter field winding, and a portion of said resistance to the other of said leads.

5. A power factor control hookup for synchronous motor generator sets including a compound wound exciter for the motor, a compound wound direct current generator having a series field winding, and a circuit connecting the series field of said generator and the field winding of said exciter whereby the voltage to the exciter will be increased proportionately to the increase in load on the generator and the power factor thereby automatically controlled.

In testimony whereof we hereunto affix our signatures this 10th day of August, A. D. 1928.

JOHN F. USENER, Sr.
JOHN F. USENER, Jr.